Nov. 13, 1934.　　　　E. S. COOK　　　　1,980,322
FLUID PRESSURE BRAKE
Filed July 23, 1932
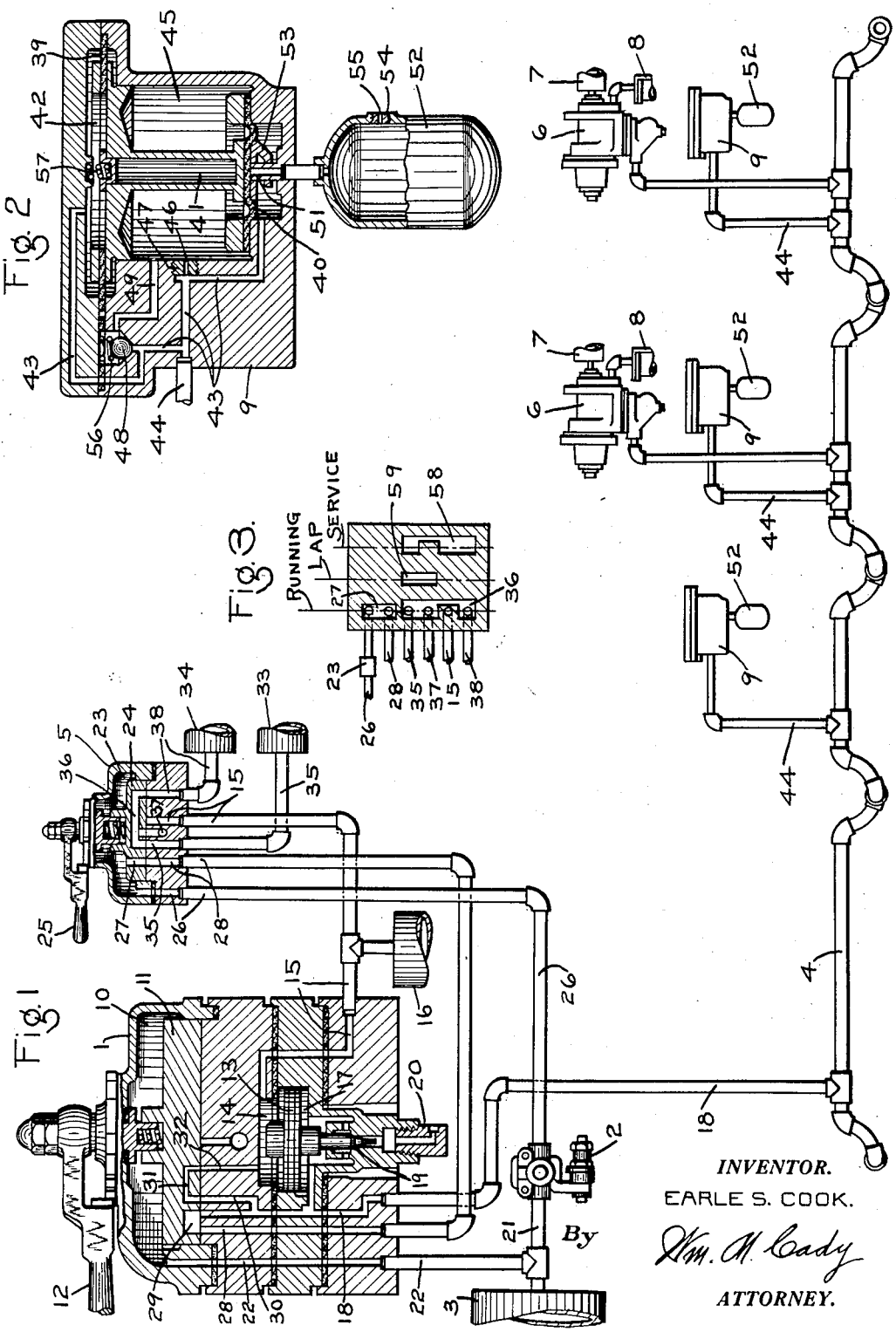
INVENTOR.
EARLE S. COOK.
By Wm. M. Cady
ATTORNEY.

Patented Nov. 13, 1934

1,980,322

UNITED STATES PATENT OFFICE 1,980,322

FLUID PRESSURE BRAKE

Earle S. Cook, Wilkinsburg, Pa., assignor to The Westinghouse Air Brake Company, Wilmerding, Pa., a corporation of Pennsylvania Application July 23, 1932, Serial No. 624,247

4 Claims. (Cl. 303—83)

This invention relates to fluid pressure brakes, and more particularly to an automatic fluid pressure brake system in which the brakes are applied by effecting a reduction in brake pipe pressure and in which the brakes are released by effecting an increase in brake pipe pressure.

In the handling of long trains it is highly desirable to apply the brakes on cars at the rear end of the train as nearly as possible in synchronism with the application of the brakes on cars at the head end of the train, so as to prevent the slack in the train from running in at such a rate as to cause excessive and damaging shocks.

In order to accomplish this result it has heretofore been proposed to provide means on the locomotive of the train for automatically effecting successive light reductions in brake valve device pressure so long as the usual brake valve device is held in service position, and to provide a vent valve device on each car of the train which will respond quickly to the successive reductions initiated by the means on the locomotive, to locally vent fluid under pressure from the brake pipe.

Instead of having these successive reductions in brake pipe pressure at the locomotive controlled automatically, it may be desired to have them under the control of an operator and the principal object of my invention is to provide manually controlled means on the locomotive for effecting successive light reductions in brake pipe pressure to apply the brakes.

Another object of my invention is to provide the usual type of locomotive brake equipment with means operable manually in effecting an application of the brakes for controlling the operation of the equalizing mechanism of the automatic brake valve device of the equipment to effect successive light reductions in brake pipe pressure.

According to this object, the manually operable means for controlling the successive light reductions in brake pipe pressure may be added to an existing locomotive brake equipment without excessive cost and without altering the control of the brakes by the use of the automatic brake valve device of the equipment.

Other objects and advantages will appear in the following more detailed description of the invention.

In the accompanying drawing: Fig. 1 is a diagrammatic view, with parts of the locomotive brake apparatus in section, of a fluid pressure brake system for a train of vehicles, and embodying my invention; Fig. 2 is a sectional view of a quick service brake pipe venting valve device employed on the cars of the train; and Fig. 3 is a diagram, showing the connections made in the different operating positions of one of the brake valve devices of the locomotive brake apparatus.

The fluid pressure brake system may comprise the usual locomotive brake equipment. Only the automatic brake valve device 1, feed valve device 2, main reservoir 3 and brake pipe 4 of the usual locomotive brake equipment are shown in the drawing, since it is thought that the invention will be more clearly understood than if the other parts of the equipment were shown.

In addition to the usual locomotive brake equipment, according to my invention, a brake valve device 5 is provided which is operable manually to control the operation of the usual equalizing discharge valve mechanism of the brake valve device 1 to effect successive reductions in brake pipe pressure.

On each car of the train is provided the usual brake controlling valve device, such as the triple valve device 6, which is operated in the usual manner upon a reduction in pressure in the brake pipe 4 to supply fluid under pressure from an auxiliary reservoir 7 to the brake cylinder 8 to effect an application of the brakes and which is operated upon an increase in brake pipe pressure to vent fluid under pressure from the brake cylinder to effect the release of the brakes. On each car there is also provided a quick service brake pipe venting valve device 9 which is adapted to be operated upon a reduction in brake pipe pressure for effecting a local venting of fluid from the brake pipe.

The brake valve device 1 comprises a casing having a valve chamber 10 containing a rotary valve 11 adapted to be operated by a handle 12. In the brake valve casing is mounted the usual equalizing discharge valve mechanism, comprising a piston 13, having a chamber 14 at one side connected through a passage and pipe 15, with the usual equalizing reservoir 16. At the opposite side of the piston 13 there is a chamber 17 which is connected, through a passage and pipe 18 to the brake pipe 4.

The piston 13 is adapted to operate a discharge valve 19 for venting fluid from the brake pipe to the atmosphere through a discharge fitting 20 having screw-threaded connection with the brake valve casing. The main reservoir 3 is connected through a pipe 21 and a pipe and passage 22 to the rotary valve chamber 10 and is connected, through pipe 21, to the inlet side of the feed valve device 2.

The brake valve device 5 comprises a casing having a valve chamber 23 containing a rotary valve 24 adapted to be operated by a handle 25. The feed valve device 2 is adapted to supply fluid under pressure from the main reservoir 3, at a reduced pressure, through a pipe and passage 26 to the valve chamber 23.

With the rotary valves 11 and 24 of the brake valve devices 1 and 5, respectively, in running position as shown in Fig. 1 of the drawing, fluid under pressure supplied to the valve chamber 23 of the brake valve device 1 flows to the brake pipe 4 through a port 27 in the rotary valve 24, passages and pipe 28, a cavity 29 in the rotary valve 11 and passage and pipe 18. From the passage 18 fluid flows directly to the chamber 17 at one side of the piston 13 and also flows to the chamber 14 at the opposite side through a passage 30, a cavity 31 in the rotary valve 11, and a somewhat constricted passage 32. From the chamber 14 fluid under pressure flows through passage and pipe 15 to the equalizing reservoir 16 and to the seat of the rotary valve 24.

Further, in addition to the usual locomotive brake equipment, two reduction reservoirs 33, 34 are provided which, in the running position of the rotary valve are open to the atmosphere, the communication from the reservoir 33 to the atmosphere being by way of a pipe and passage 35, a passage 36 in the rotary valve 24 and a passage 37, and the communication from the reservoir 34 being by way of a pipe and passage 38, passage 36 in the rotary valve 24 and passage 37.

The quick service venting valve device 9 to be employed on each car of the train may be identical with the device shown and described in prior applications, Serial Nos. 563,278 and 620,126, filed September 17, 1931, and June 30, 1932, respectively.

The valve device 9 as shown in section in Fig. 2 of the drawing, may comprise a casing in which is mounted flexible diaphragms 39 and 40 which are connected, to move in unison, by a hollow stem 41.

The chamber 42 at one side of the diaphragm 39, which diaphragm is of greater area than the diaphragm 40, is connected to a passage 43 which leads to a pipe 44 communicating with the brake pipe 4. The chamber 45 intermediate the diaphragms 39 and 40 is also connected to passage 43 through a restricted port 46 in a choke plug 47, and passage 43 is further connected to chamber 45 by way of a check valve 48 and a passage 49. The chamber 50 at the outer face of the diaphragm 40 is also connected to passage 43.

The diaphragm 40 is adapted to engage a valve seat provided on a seat member 51, and controls communication from chamber 50 to a bulb or quick service reservoir 52. Carried by the diaphragm 40 is a guide member 53 which is guided on the seat member 51. The reservoir 52 is provided with a choke plug 54 having a restricted port 55, so that fluid can vent from the reservoir 52 at all times at a rate as determined by the flow area of the port 55.

It will be seen that in operation, when the brake valve devices 1 and 5 are in running position, as shown in Fig. 1 of the drawing, the brake pipe 4, chambers 14 and 17 at the opposite sides of the piston 13 and equalizing reservoir 16 are maintained charged with fluid at feed valve pressure. The opposing pressures on opposite sides of the piston 13 are substantially equal and as a consequence the piston 13, due to the force of gravity, holds the discharge valve 19 seated.

On the cars of the train, the triple valve device 6 and auxiliary reservoir 7 are charged with fluid under pressure from the brake pipe 4 in the usual manner, and the chamber 42 of the quick service valve device 9 is charged from the brake pipe 4 by way of pipe 44 and passage 43. The chamber 45 is charged with fluid under pressure through passage 43 and port 46 and also past the check valve 48 through passage 49. The flow past the check valve 48 does not occur, however, until the pressure of fluid in passage 43, acting below the check valve 48, slightly exceeds the fluid pressure in chamber 45, which acts above the check valve, plus the pressure of a spring 56.

The by-pass charging passage 49 with the check valve 56 are provided so as to permit a more rapid build up of pressure in chamber 45 when the brake pipe pressure is increased to release the brakes since recharge by way of the restricted port 46 would be so slow that particularly at the head end of the train, the brake pipe pressure would be increased in the chamber 42 so much more rapidly than in chamber 45, that there would be liability of damage or rupture to the diaphragm 39. At the same time, the flow of fluid from the brake pipe to the chamber 45 is somewhat retarded by the action of the spring-pressed check valve 48, so that in releasing, the diaphragm 40 will be held seated by the higher pressure in chamber 42.

When the fluid pressures on the diaphragms 39 and 40 have substantially equalized, the diaphragms will be operated to maintain the diaphragm 40 seated against the seat member 51 by the pressure of a spring 57.

In order to effect a service application of the brakes, the handle 25 of the brake valve device 5 is first moved from running position to service position and then to lap position. The movement of the handle from lap to service position and from service to lap position is continued until the desired brake cylinder pressure on the train is obtained.

When the handle 25 is moved to service position, the rotary valve 24 laps the passage 28 and thus closes communication from the feed valve device 2 to the brake valve device 1 and also laps the passage 37 and thus closes communication from the reduction reservoirs 33 and 34 to the atmosphere. In service position a cavity 58 in the rotary valve 24 connects the passage 15 to passages 35 and 38, so that the pressure of fluid in piston chamber 14 and equalizing reservoir 16 quickly equalizes into the reduction reservoirs 33 and 34. The flow of fluid from the chamber 14 will be at a faster rate then fluid is supplied from the brake pipe 4 by way of passage 32, so that upon the equalization of the pressures in the manner just described, a reduction in the pressure of fluid in chamber 14 and equalizing reservoir 16 results.

The reduction in fluid pressure in chamber 14 and in the equalizing reservoir 16, causes the higher brake pipe pressure in chamber 17 to lift the piston 13 so as to unseat the discharge valve 19. Fluid under pressure is then vented from chamber 17 and the brake pipe 4 through the exhaust fitting 20 to the atmosphere.

When the brake pipe pressure has been reduced, by flow past the discharge valve 19, to substantially that of the pressure of fluid in chamber 14, the piston 13, due to the force of gravity, will move downwardly and cause the valve 19 to seat, thus cutting off the further venting of fluid from the brake pipe 4.

When the handle 25 is moved from service position to lap position, a cavity 59 in the rotary valve 24 connects the passages 35 and 37 so that fluid under pressure is quickly vented from the reduction reservoir 33 to the atmosphere. The rotary valve 24 in lap position laps the passages 15 and 38 so that the reservoirs 16 and 34 are maintained charged and also maintains the passage 28 leading from the feed valve device lapped.

Now when the handle 25 is moved to service position and the cavity 58 in the rotary valve 24 establishes communication between the passages 15, 35 and 38 the pressures of fluid in the chamber 17, equalizing reservoir 16 and reduction reservoir 34 equalize into the reduction reservoir 33, causing a reduction in the pressure of fluid in chamber 14, so that the operation of the piston 13 and discharge valve 19 to vent fluid under pressure from the brake pipe is repeated.

It will here be noted that in effecting the initial application of the brakes, the pressures of fluid in the chamber 14 and equalizing reservoir 16 equalize into the reduction reservoirs 34 and 35 which are at atmospheric pressure and that in effecting succeeding applications the pressures of fluid in chamber 14, equalizing reservoir and reservoir 35 equalize into the reservoir 34 which is at atmospheric pressure, consequently a greater reduction in brake pipe pressure is made in effecting the initial application than in effecting subsequent applications. As a result more fluid pressure will be supplied to the brake cylinder during the initial application than on each subsequent application. This of course is very desirable since more fluid pressure is required to fill up the volume of the brake cylinder as the brake cylinder piston is moved outwardly until the usual brake shoes are in engagement with the car wheels than is required when the shoes are in engagement with the wheels.

It will be seen from the foregoing description that by moving the handle 25 of the brake valve device 5, an operator may effect successive limited reductions in brake pipe pressure.

On the cars of the train the initial and each succeeding reduction in brake pipe pressure produced by the use of the brake valve device 5, causes a corresponding reduction in fluid pressure in the chamber 42 of the vent valve device 9. The pressure in chamber 45 can only reduce by flow through the restricted port 46, so that the pressure of fluid in chamber 42 reduces at a greater rate than the pressure in chamber 45. A differential pressure is thus created on the diaphragm 39 which causes the upward movement of the diaphragms 39 and 40, so that the diaphragm 40 is moved away from the seat member 51, permitting the flow of fluid from the brake pipe 4, through pipe 44 and passage 43 to the quick service chamber 52.

A local venting of fluid from the brake pipe to chamber 52 is thus produced, which is effected serially on the cars of the train from the front to the rear.

Due to the relative areas of the diaphragms 39 and 40, the light weight of the parts and the short movement required to unseat the diaphragm 40, the valve device 9 will operate when only a light differential of pressure has been created between the chambers 42 and 45, so that a local reduction in brake pipe pressure is produced very quickly in response to a reduction in brake pipe pressure.

On the other hand by properly proportioning the flow area of the port 46, the valve device 9 can be made responsive only when the rate of reduction in brake pipe pressure is such as to cause the necessary differential pressure to be created.

As a consequence the quick service valve device is rendered stable and is not responsive to fluctuations in brake pipe pressure, due to leakage from the brake pipe and slight variations in brake pipe pressure due to variations in the operation of the feed valve device 2.

In other words, the vent valve device 9 is responsive and only responsive, when the reduction in brake pipe pressure is at a desired predetermined rate.

As soon as the rate of reduction in brake pipe pressure becomes less than the rate required to maintain the pressure differential necessary to hold the diaphragm 39 in its upper position, the spring 57 acts to move the diaphragm downwardly, so that diaphragm 40 engages the seat member 51 and thus cuts off the further venting of fluid from the brake pipe.

The successive waves of reduction in brake pipe pressure as produced by the manual operation of the brake valve device 5 on the locomotive, causes corresponding successive operations of the quick service valve device 9, so that a succession of local reductions in brake pipe pressure are produced on each car of the train.

When the diaphragm 40 seats on the seat member 51 the fluid in chamber 52 is vented to the atmosphere at a rate as permitted by the restricted port 55, so that the pressure in said chamber is reduced to provide for a further reduction in brake pipe pressure when the diaphragm 40 opens communication from the brake pipe to the chamber at each successive reduction in brake pipe pressure.

The volume of the chamber 52 is made such as to give the desired brake pipe reduction, taking into consideration the volume of the brake pipe on each car.

By providing a service vent valve device on cars of the train which responds quickly to a light reduction in brake pipe pressure at a predetermined rate to effect a light predetermined local reduction in brake pipe pressure, the transmission time from the front to the rear of the train is greatly reduced as compared with previous devices of this character, so that the brakes on the cars at the rear end of the train are applied more nearly in synchronism with the brakes on the cars at the front end of the train, and by providing manually operable means on the locomotive for effecting successive reductions in brake pipe pressure, the brake pipe pressure can be reduced throughout the train to any desired degree, so as to produce the desired brake application.

In releasing the brakes, the rotary valve 24 of the brake valve device 5 is turned to running position in which, with the rotary valve 11 of the brake valve device 1 in running position as shown in Fig. 1 of the drawing, fluid under pressure supplied by the feed valve device 2, flows to and charges the brake pipe, causing the several parts of the car brake equipments to function in the usual manner to release position. If a more rapid recharge of the brake pipe is desired than can be accomplished by the flow of fluid from the feed valve device 2, the rotary valve 11 of the brake valve device 1 is turned to release position and maintained in this position for a predetermined time and then moved to running position. With the rotary valve 11 in release position fluid under pressure is supplied in the usual well known manner directly from the main reservoir 3 to the brake pipe and when returned to running position closes off the communication from the main reservoir to the brake pipe and again establishes the communication from the feed valve device to the brake pipe as shown in Fig. 1.

In some cases such as in operating a short train or in operating a train not equipped with the vent valve devices 9, the brakes may be controlled in the usual manner by the use of the automatic brake valve device 1. When the automatic brake valve device is used to control the brakes, the brake valve device 5 will be left in running position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a feed valve device, a brake pipe, an equalizing reservoir, a brake valve device normally establishing communication through which fluid under pressure from the feed valve device is supplied to the said brake pipe and equalizing reservoir and valve mechanism included in the brake valve device and operated upon a reduction in pressure in the equalizing reservoir for venting fluid under pressure from the brake pipe to effect an application of the brakes, of a second brake valve device normally establishing a communication through which flud is supplied from the feed valve device to the communication in the first mentioned brake valve device and operable to close the communication from the feed valve device to the first mentioned brake valve device and to effect successive reductions in equalizing reservoir pressure, and means for limiting the degree of each reduction in equalizing reservoir pressure.

2. In a fluid pressure brake, the combination with a feed valve device, a brake pipe, an equalizing reservoir, a brake valve device normally establishing communication through which fluid under pressure from the feed valve device is supplied to the said brake pipe and equalizing reservoir and valve mechanism included in the brake valve device and operated upon a reduction in pressure in the equalizing reservoir for venting fluid under pressure from the brake pipe to effect an application of the brakes, of a plurality of reduction reservoirs, and a second brake valve device normally establishing a communication through which both of said reduction reservoirs are open to the atmosphere and normally establishing a communication through which fluid is supplied from the feed valve to the communication in the first mentioned brake valve device and operable to a position for closing the communication from the feed valve device to the first mentioned brake valve device, for closing communication from the reduction reservoirs and for establishing communication through which fluid is vented from the equalizing reservoir to the reduction reservoirs.

3. In a fluid pressure brake, the combination with a feed valve device, a brake pipe, an equalizing reservoir, a brake valve device normally establishing communication through which fluid under pressure from the feed valve device is supplied to the said brake pipe and equalizing reservoir and valve mechanism included in the brake valve device and operated upon a reduction in pressure in the equalizing reservoir for venting fluid under pressure from the brake pipe to effect an application of the brakes, of a plurality of reduction reservoirs, and a second brake valve device normally establishing a communication through which both of said reduction reservoirs are open to the atmosphere and normally establishing a communication through which fluid is supplied from the feed valve to the communication in the first mentioned brake valve device and operable to a position for closing the communication from the feed valve device to the first mentioned brake valve device, for closing communication from the reduction reservoirs and for establishing communication through which fluid is vented from the equalizing reservoir to the reduction reservoirs and operable to another position in which fluid under pressure is vented from one of said reservoirs only.

4. In a fluid pressure brake, the combination with a feed valve device, a brake pipe, an equalizing reservoir, a brake valve device normally establishing communication through which fluid under pressure from the feed valve device is supplied to the said brake pipe and equalizing reservoir and valve mechanism included in the brake valve device and operated upon a reduction in pressure in the equalizing reservoir for venting fluid under pressure from the brake pipe to effect an application of the brakes, of a plurality of reduction reservoirs, and a second brake valve device normally establishing a communication through which both of said reduction reservoirs are open to the atmosphere and normally establishing a communication through which fluid is supplied from the feed valve to the communication in the first mentioned brake valve device and operable to a brake applying position for closing off the flow of fluid from the feed valve device to the first mentioned brake valve device, for closing communication from the reduction reservoirs to the atmosphere and for venting fluid under pressure from the equalizing reservoir to the reduction reservoirs, and operable from application position to a lap position for closing the communication from the equalizing reservoir to the reduction reservoirs and venting fluid under pressure from one of said reservoirs only.

EARLE S. COOK.